United States Patent [19]

Lee et al.

[11] Patent Number: 5,692,066

[45] Date of Patent: Nov. 25, 1997

[54] METHOD AND APPARATUS FOR IMAGE PLANE MODULATION PATTERN RECOGNITION

[75] Inventors: Shih-Jong J. Lee, Bellevue; William E. Ortyn, Devall, both of Wash.

[73] Assignee: NeoPath, Inc., Redmond, Wash.

[21] Appl. No.: 309,148

[22] Filed: Sep. 20, 1994

[51] Int. Cl.[6] .................................................. G06K 9/00
[52] U.S. Cl. ............................................................ 382/133
[58] Field of Search .................................... 382/133, 134, 382/128, 266; 356/237, 239

[56] References Cited

U.S. PATENT DOCUMENTS

| | | | |
|---|---|---|---|
| 3,729,252 | 4/1973 | Nelson | 350/162 SF |
| 3,824,393 | 7/1974 | Brain | 250/222 PC |
| 4,093,991 | 6/1978 | Christie, Jr. et al. | 364/525 |
| 4,175,860 | 11/1979 | Bacus | 356/39 |
| 4,391,494 | 7/1983 | Hershel | 350/442 |
| 4,425,037 | 1/1984 | Hershel et al. | 355/43 |
| 4,444,492 | 4/1984 | Lee | 355/55 |
| 4,555,621 | 11/1985 | Buchar | 250/205 |
| 4,600,302 | 7/1986 | Sage, Jr. | 356/39 |
| 4,649,261 | 3/1987 | Sheets | 219/390 |
| 4,681,414 | 7/1987 | Hershel | 353/102 |
| 4,698,486 | 10/1987 | Sheets | 250/492.2 |
| 4,734,829 | 3/1988 | Wu et al. | 362/32 |
| 4,747,030 | 5/1988 | Offner et al. | 362/302 |
| 4,750,837 | 6/1988 | Gifford et al. | 356/417 |
| 4,802,768 | 2/1989 | Gifford et al. | 356/417 |
| 4,823,043 | 4/1989 | Roberts et al. | 313/231.61 |
| 4,883,333 | 11/1989 | Yanez | 350/96.1 |
| 4,965,725 | 10/1990 | Rutenberg | 382/155 |
| 5,050,946 | 9/1991 | Hathaway et al. | 385/33 |
| 5,067,812 | 11/1991 | Sugimura et al. | 356/239 |
| 5,103,385 | 4/1992 | Federico et al. | 362/298 |
| 5,109,465 | 4/1992 | Klopotek | 385/133 |
| 5,202,950 | 4/1993 | Arego et al. | 385/146 |
| 5,215,370 | 6/1993 | Kaplan | 362/296 |
| 5,218,660 | 6/1993 | Omata | 385/116 |
| 5,257,182 | 10/1993 | Luck et al. | 395/924 |
| 5,287,272 | 2/1994 | Rutenberg et al. | 382/155 |
| 5,315,700 | 5/1994 | Johnston et al. | 395/163 |
| 5,361,140 | 11/1994 | Hayenga et al. | 358/446 |

OTHER PUBLICATIONS

Yu et al, "Principles of Optical Engineering" 1990 pp. 276–277.

Bacus, James W. and Les J. Grace, "Optical Microscope System For Standardized Cell Measurements and Analyses", *Applied Optics*, 26:16, pp. 3280–3293, 15 Aug. 1987.

Bartels, Peter H. et al., "A Self–Learning Computer Program for Cell Recognition", *ACTA Cytologica: The Journal of Clinical Cytology*, 14:8, pp. 486–494, Oct. 1970.

Iwasaki, Kenji et al., "Design Ideas: Flattening Laserbeam Intensity Distribution", *Lasers & Applications*, p. 76, Apr. 1983.

Tanaka, Noboru et al., "Automated Cytologic Screening System (CYBEST Model 4): an Integrated Image Cytometry System", Reprinted from *Applied Optics*, vol. 26, No. 16, pp. 3301–3307, Aug. 15, 1987. Copyright © 1987 by the Optical Society of America.

Born, Max et al., *Principles of Optics: Electromagnetic Theory of Propagation Interference and Diffraction of Light*, 6th Edition, Pergamon Press, Copyright ©1980, pp. 224–225.

O'Shea, Donald, *Elements of Modern Optical Design*, Copyright ©1985 by John Wiley & Sons, Inc., pp. 111–115.

*Primary Examiner*—Joseph Mancuso
*Assistant Examiner*—Gerard Del Rosso
*Attorney, Agent, or Firm*—Emil Moffa; Hans I. Sun

[57] ABSTRACT

The detection of optical stripes on an image of a glass slide of material of interest. An automated microscope system with an illuminator having a spatial intensity homogenizer provides spatially uniform illumination of a microscope slide specimen. Periodic optical patterns formed from the illumination system are detected by a computer system. The computer forms a high transmission mask of an image of the biological specimen. Edges in the image are detected and a low transmission area process is performed. Horizontal stripes are enhanced. A final thresholding generates a binary image of the patterns. Stripes in the patterns are detected an a stripe flag and strip area are calculated.

33 Claims, 16 Drawing Sheets

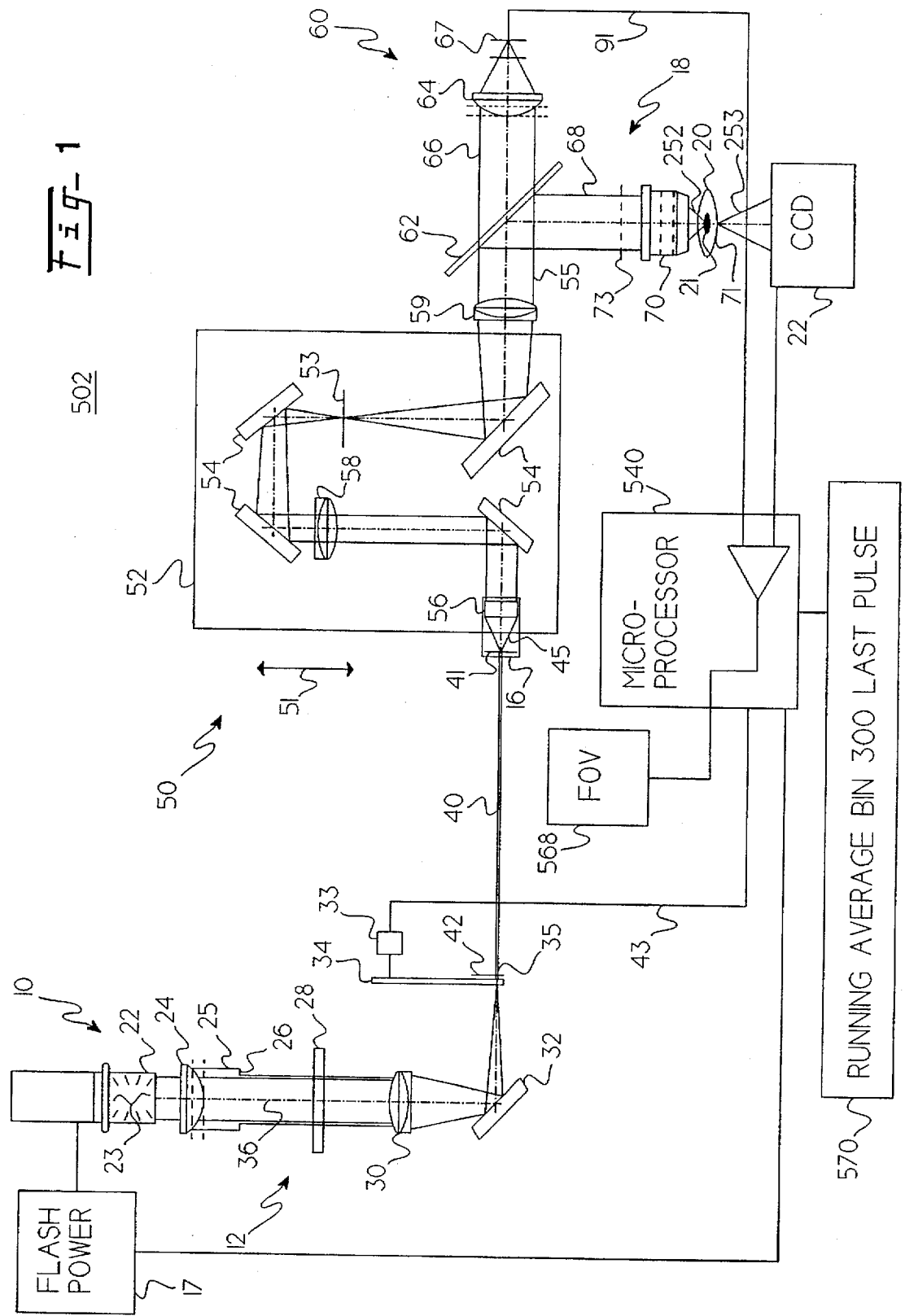

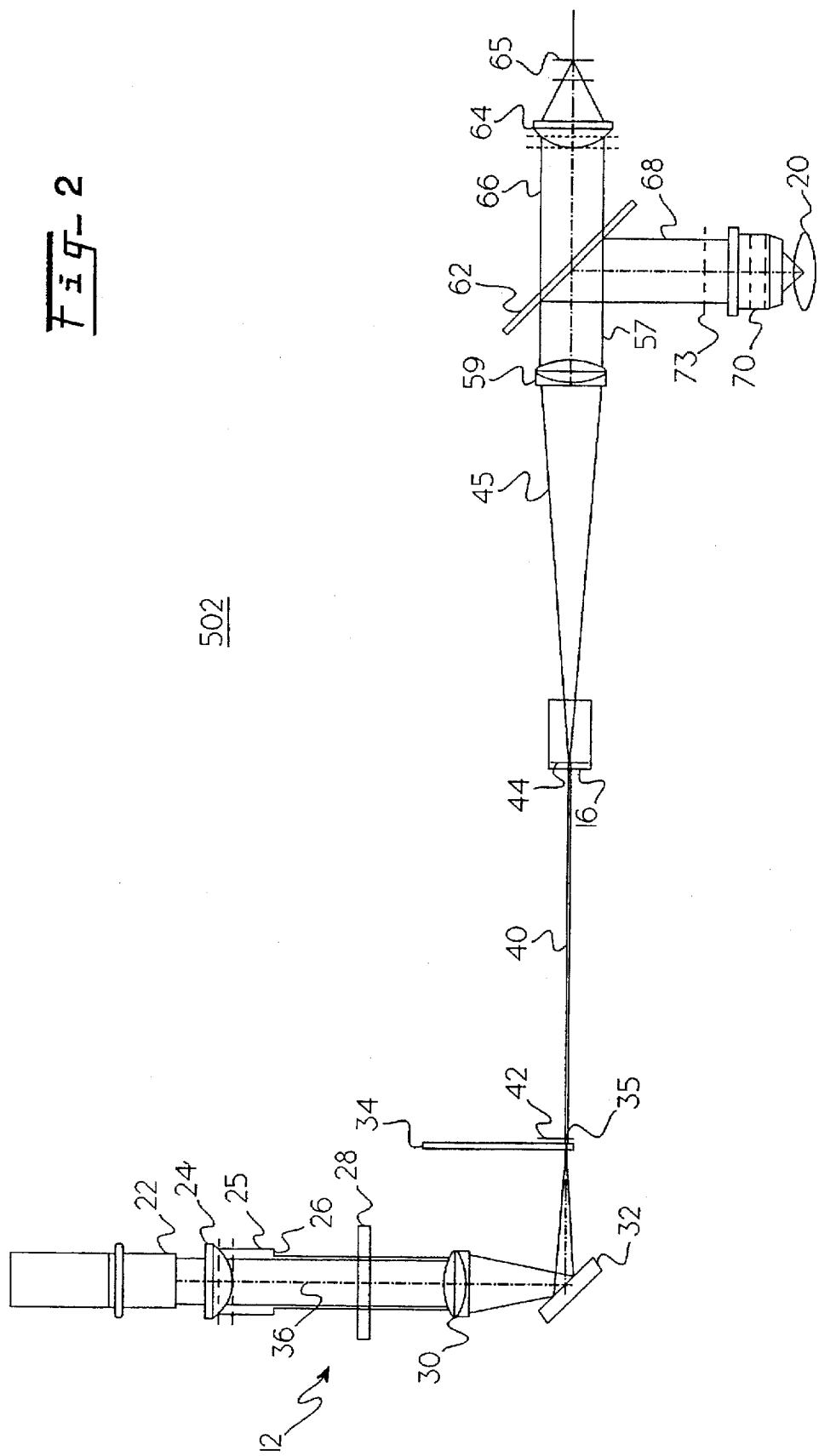

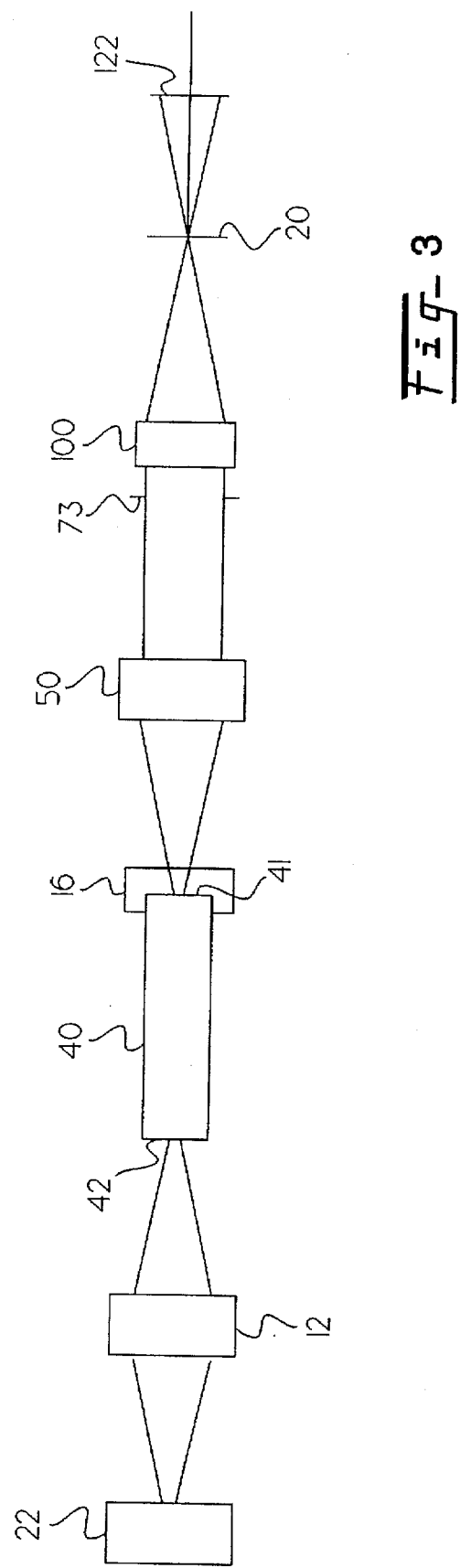

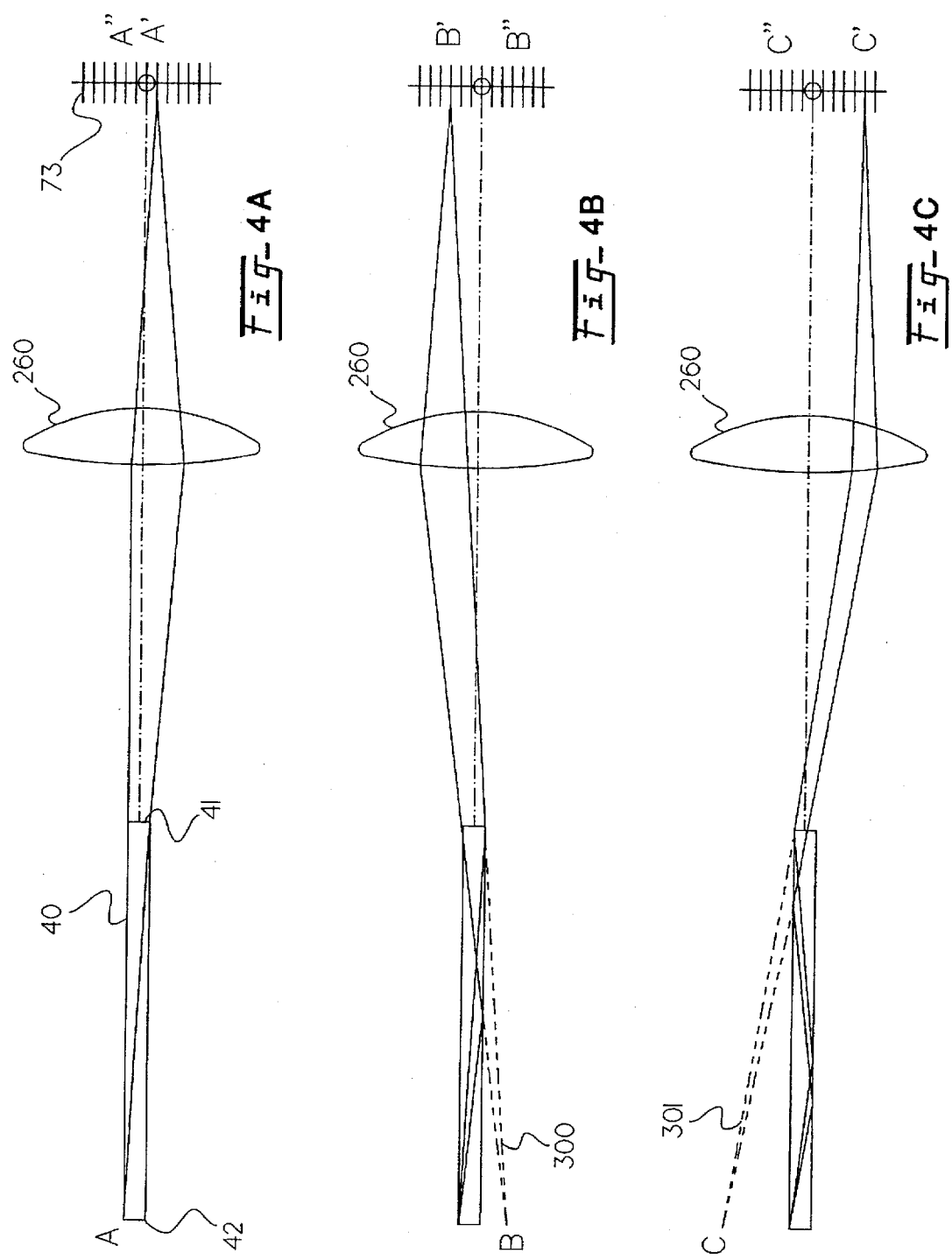

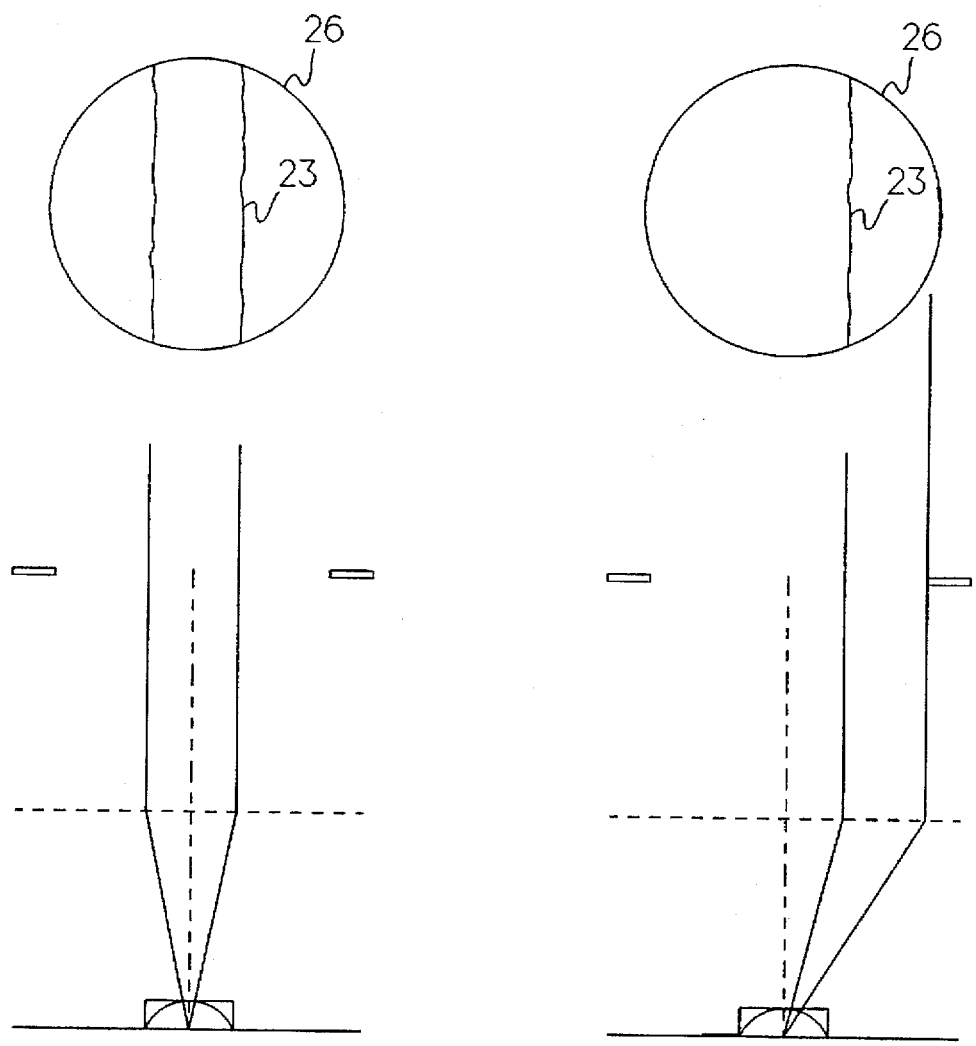
Fig_6A    Fig_6B

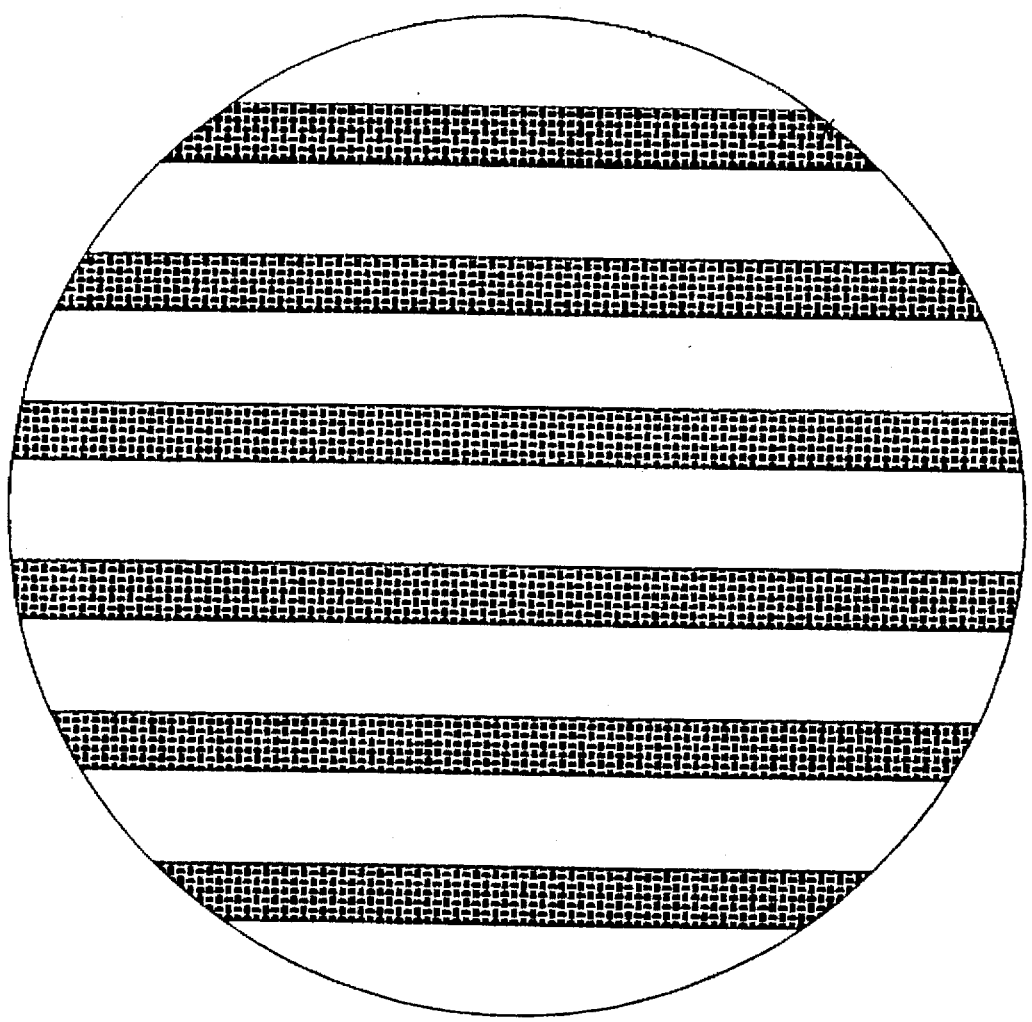
Fig_13

METHOD AND APPARATUS FOR IMAGE PLANE MODULATION PATTERN RECOGNITION

The present invention relates to a method and apparatus for the generation and detection of liner modulation patterns in the image plane of coverslipped microscope specimens. The detection of these patterns indicates the presence of flawed or contaminated coverslips. More specifically, the invention relates to the generation of periodically structured light in the aperture space of an illumination system for an automated cytology instrument. This periodically structured light in combination with artifacts on the coverslip of the specimen produces modulation patterns in the image plane of the specimen. The method and apparatus of the invention detects these modulation patterns related to flawed or contaminated coverslips.

BACKGROUND OF THE INVENTION

Automated analysis of biological specimens requires a high degree of spatial and temporal uniformity for accurate and repeatable evaluation. Those evaluations often measure photometric properties such as nuclear and cytoplasm density. In order to accurately and repeatably measure these properties, the illumination must maintain a high degree of uniformity across the field of view and from collected image to collected image. In addition, morphological operations are conducted to segment various objects in the field of view for further analysis. This analysis determines various feature values related to size, shape and frequency content etc. Operations used in such analyses tend to exhibit nonlinear behavior due to various thresholding schemes that may be employed. Therefore, accurate and repeatable behavior of these processing methods also necessitates a high degree of uniformity across the field of view and from collected image to collected image. Further, these objects tend to be three dimensional in nature and therefore can be affected by shadowing, dependent on the angular characteristics of the illumination. Still further, the images of those objects can be corrupted by dust and fingerprints and the like located on the cover slips of those specimens.

Automated cytology systems, have another problem caused by substrate thickness variation. In practice, the substrate, or microscope slide thickness' can vary by as much as 0.9 mm. As the microscope slide is introduced into the optical path, it becomes part of the optical apparatus for illuminating the specimen. A variation in thickness of this element may have an effect on the axial position of the optical stops of the system, in particular, the field stop or detector plane. When the slide thickness varies, the location of the detector, as imaged in the illumination train, tends to move along the optic axis. It often happens, that this movement of the detector plane falls onto one or more element surfaces in the illumination train. This causes dust or defects in those surfaces to be imaged onto the detector, thereby, creating artifacts in the image plane and degrading the image of the specimen.

A final problem which has received little or no mention in the prior art is the detection of dust, debris, fingerprints and other contaminants of the surface of a coverslip. Even with perfect illumination, artifacts, such as those on the coverslips of specimens, can compromise the integrity of information contained in the image plane of those specimens. This is due to an alteration in the optical wave-front generated by the light interaction of the illumination system and the object after that wave-front leaves the specimen. If the wave-front is obscured, or aberrated, in any way, on it's path to the detector in the image plane, the integrity of the information contained in the wave-front, regarding the characteristics of the object, may be compromised. The illumination system can play a role in the manner in which contaminants on the coverslip manifest themselves in the image plane.

Therefore, in consideration of the problems associated with illumination in the automated analysis of pap smears, it is a motive of this invention to provide illumination in such a way as to allow the real time detection of contaminants on the coverslips of pap smears.

SUMMARY OF THE INVENTION

The invention provides a method and apparatus to detect dark bands or "stripes" that appear on the image because of dust, dirt or other sources of occlusion that fall on or are found on the slide being illuminated. An automated microscope system with an illuminator having a spatial intensity homogenizer provides spatially uniform illumination of a microscope slide specimen. Periodic optical patterns formed from the illumination system are detected by a computer system. The computer forms a high transmission mask of an image of the biological specimen. Edges in the image are detected and a low transmission area process is performed. Horizontal stripes are enhanced. A final thresholding generates a binary image of the patterns. Stripes in the patterns are detected and a stripe flag and strip area are calculated. Since these patterns alter the true information content of the image, the stripe detects the horizontal modulation patterns. If the degree of the modulations is beyond a predetermined level, the slide is considered unsuitable for processing.

The stripe is best revealed in the image background with high light-transmission. This processing step isolates the area of the image having high light-transmission, higher than 210 in pixel value. It applies a global threshold of 210 to the original image and creates a binary image mask of the area having pixel values greater than 210. The high transmission image mask is then shrunk by two morphological erosion operations. The structuring elements include a square, 5 by 5 pixels in size, and a diamond shaped kernel, a center pixel and its four adjacent pixels in horizontal and vertical directions. The resulting high transmission mask is designated as Ihigh_trans.

An edge detection process is applied to the original image to detect the edge gradient of the image. It enhances the high frequency information content of the horizontal modulation patterns. First, the invention applies a grayscale morphological dilation to the original image. The structuring element used is a vertical line that is 19 pixels long. Then, the original image is subtracted from the dilated image. The difference image is the edge detection result Iedge.

To focus on only the edge information contained in the high transmission area of the image, the edge image, Iedge, is combined with the high transmission image mask Ihigh_trans using an and operation. The and operation preserves the Iedgevalue of the pixels included in the Ihigh_trans mask and assigns zero to the pixels that are not in the Ihigh_trans mask. This results in a high transmission edge image, Ihigh_edge.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIG. 1 shows a schematic of the illumination apparatus of the invention used for a 20× magnification.

FIG. 2 shows a schematic of the illumination apparatus of the invention used for a 4× magnification.

FIG. 3 shows an alternate embodiment of the illumination apparatus of the invention.

FIGS. 4A, 4B and 4C show a schematic of the light pipe.

FIGS. 6A and 6B show the effect of underfill on light intensity stability.

FIG. 13 shows a mask suitable for aperture space for generation of modulation patterns.

DETAILED DESCRIPTION OF THE PREFERRED EMBODIMENT

Figure 4D:
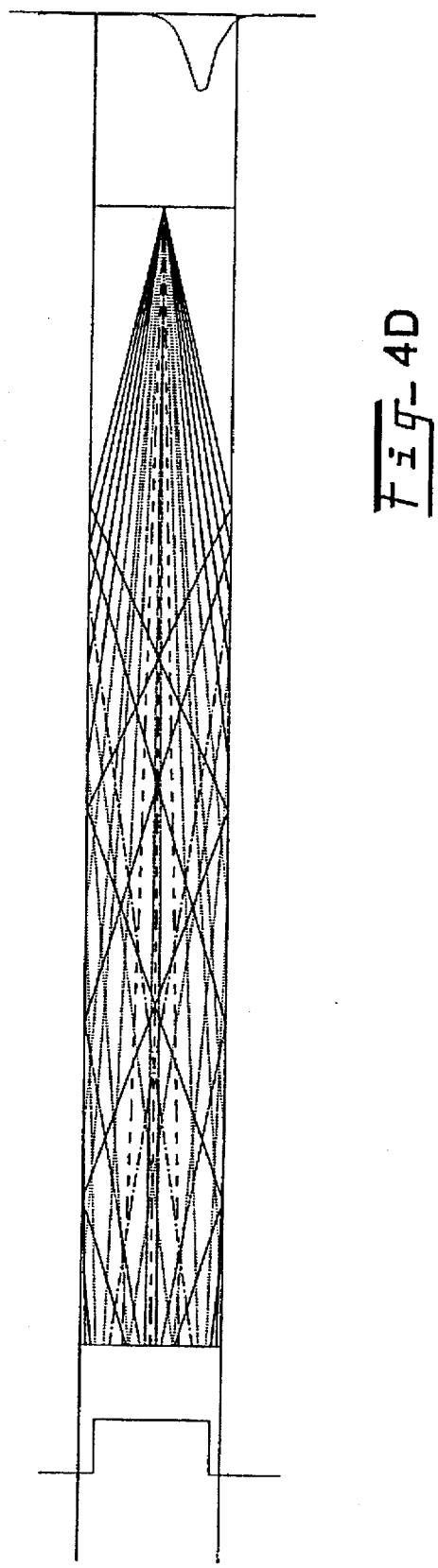
FIG. 4D shows the homogenization effect for a single point of light with only three passes of the extreme ray.

In a presently preferred embodiment of the invention, the system disclosed herein is used in a system for analyzing cervical pap smears, such as that shown and disclosed in U.S. patent application Ser. No. 08/571,686, filed Dec. 13, 1995, which is a file wrapper continuation of abandoned U.S. patent application Ser. No. 07/838,064, entitled "Method For Identifying Normal Biomedical Specimens", by Alan C. Nelson et al., filed Feb. 18, 1992; U.S. Pat. No. 5,528,703, which is a continuation in part of abandoned U.S. patent application Ser. No. 07/838,395, entitled "Method For Identifying Objects Using Data Processing Techniques", by S. James Lee, filed Feb. 18, 1992; U.S. patent application Ser. No. 07/838,070, now U.S. Pat. No. 5,315,700, entitled "Method And Apparatus For Rapidly Processing Data Sequences", by Richard S. Johnston et al., filed Feb. 18, 1992; U.S. patent application Ser. No. 07/838,065, now U.S. Pat. No. 5,361,140, entitled "Method and Apparatus for Dynamic Correction of Microscopic Image Signals" by Jon W. Hayenga et al.; and allowed U.S. patent application Ser. No. 08/302,355, filed Sep. 7, 1994 entitled "Method and Apparatus for Rapid Capture of Focused Microscopic Images" to Hayenga et al., which is a continuation-in-part of application Ser. No. 07/838,063 filed on Feb. 18, 1992 the disclosures of which are incorporated herein, in their entirety, by the foregoing references thereto.

The present invention is also related to biological and cytological systems as described in the following patent applications which are assigned to the saute assignee as the present invention, filed on Sep. 20, 1994 unless otherwise noted, and which are all hereby incorporated by reference including pending U.S. patent application Ser. No. 08/309,118, to Kuan et al. entitled, "Field Prioritization Apparatus and Method," pending U.S. patent application Ser. No. 08/309,061, to Wilhelm et al., entitled "Apparatus for Automated Identification of Cell Groupings on a Biological Specimen," pending U.S. patent application Ser. No. 08/309,116 Meyer et al. entitled "Apparatus for Automated Identification of Thick Cell Groupings on a Biological Specimen," U.S. patent application Ser. No. 08/667,292, filed Jun. 20, 1996, which is a file wrapper continuation of abandoned U.S. patent application Ser. No. 08/309,115 entitled "Biological Analysis System Self Calibration Apparatus," U.S. patent application Ser. No. 08/678,124 filed Jul. 11, 1996, which is a file wrapper continuation of abandoned U.S. patent application Ser. No. 08/308,992, to Lee et al. entitled "Apparatus for Identification and Integration of Multiple Cell Patterns," pending U.S. patent application Ser. No. 08/309,063, for which the issue fee has been paid, to Lee et al. entitled "Method for Cytological System Dynamic Normalization," pending U.S. patent application Ser. No. 08/309,248, for which the issue fee has been paid, to Rosenlof et al. entitled "Method and Apparatus for Detecting a Microscope Slide Coverslip," U.S. patent application Ser. No. 08/309,077 now U.S. Pat. No. 5,566,249 to Rosenlof et al. entitled "Apparatus for Detecting Bubbles in Coverslip Adhesive," pending U.S. patent application Ser. No. 08/309,931, to Lee et al. entitled "Cytological Slide Scoring Apparatus," pending U.S. patent application Ser. No. 08/309,250 to Lee et al. entitled "Apparatus for the Identification of Free-Lying Cells," pending U.S. patent application Ser. No. 08/309,209 to Oh et al. entitled "A Method and Apparatus for Robust Biological Specimen Classification," pending U.S. patent application Ser. No. 08/309,117, to Wilhelm et al. entitled "Method and Apparatus for Detection of Unsuitable Conditions for Automated Cytology Scoring."

It is to be understood that the various processes described herein may be implemented in software suitable for running on a digital processor. The software may be embedded, for example, in the central processor 540.

Figure 7A:
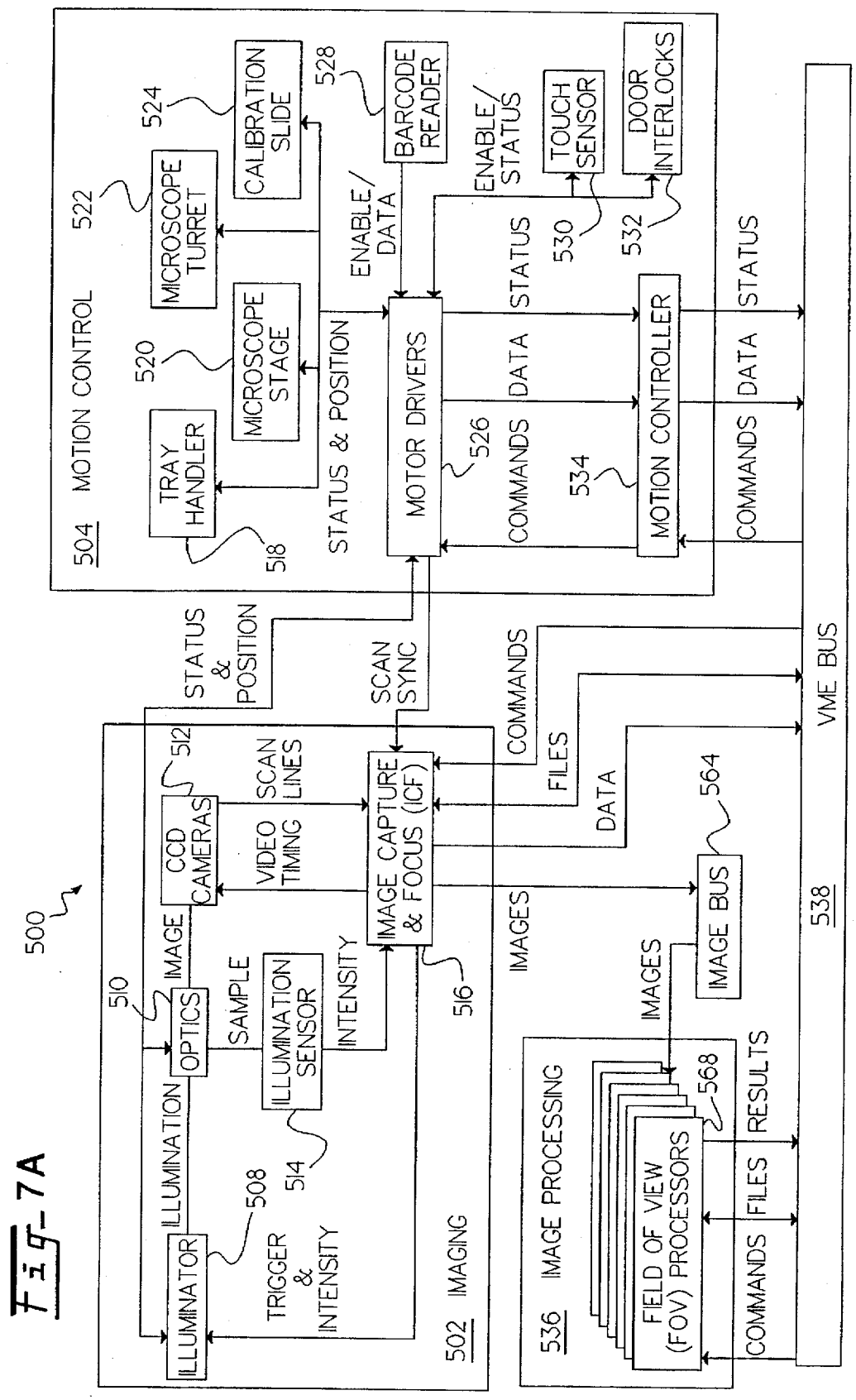
FIGS. 7A, 7B and 7C show a schematic diagram of the apparatus of the invention.
Figure 7B:
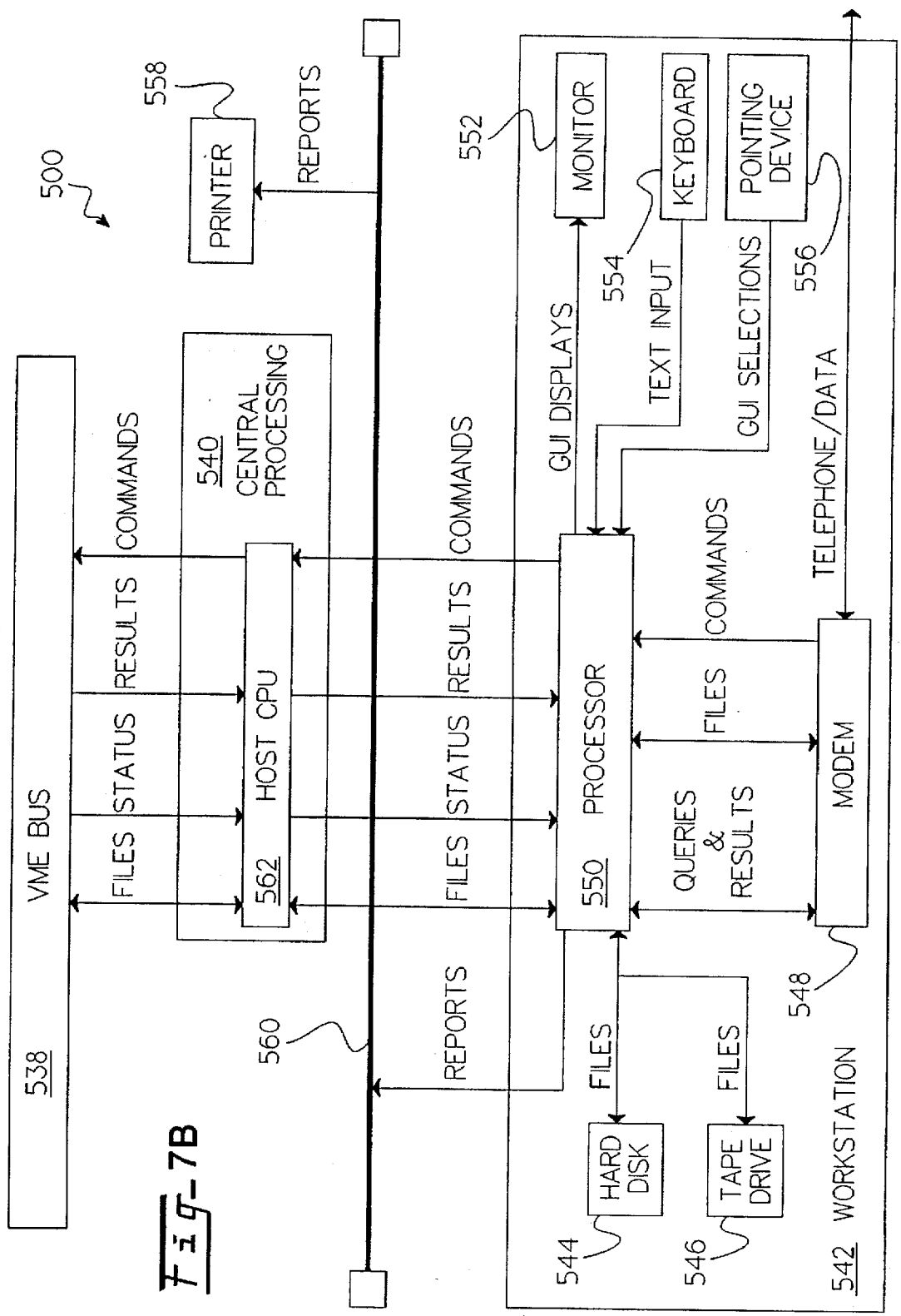
Figure 7C:
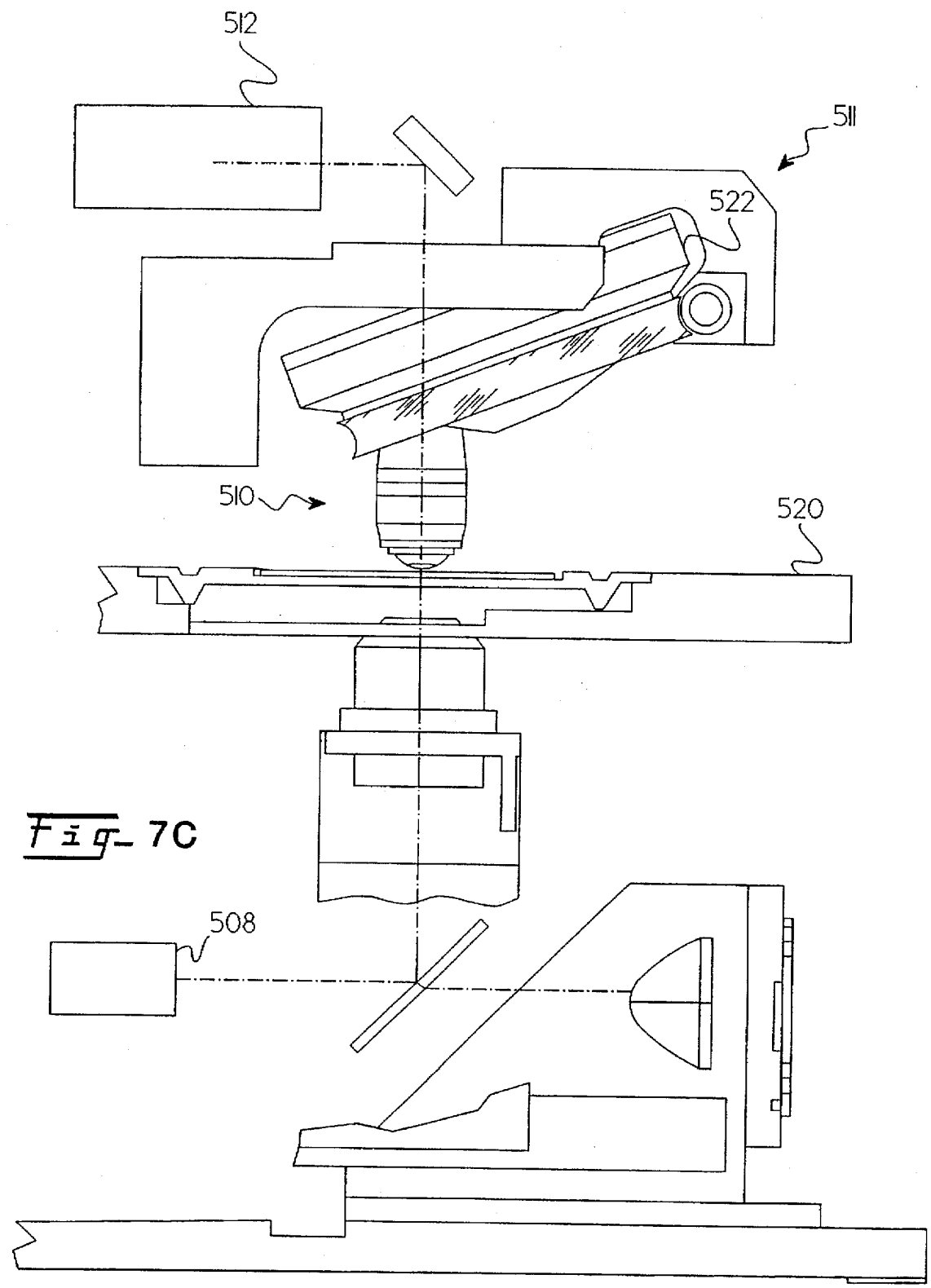

Refer now to FIGS. 7A, 7B and 7C which show a schematic diagram of an automated cytological analysis system employing the apparatus of the invention. The cytological system comprises an imaging system 502, a motion control system 504, an image processing system 536, a central processing system 540, and a workstation 542. The imaging system 502 is comprised of the uniform illuminator 10 of the invention, imaging optics 510, a CCD camera 512, an illumination sensor 514 and an image capture and focus system 515. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510. In one embodiment of the invention, the optics may further comprise an automated microscope. The illuminator 508 provides illumination of a slide. The image capture and focus system 516 provides data to a VME bus 538. The VME bus distributes the data to an image processing system 536. The image processing system 536 is comprised of field-of-view processors 568. The images are sent along the image bus 564 from the image capture and focus system 516. A central processor 540 controls the operation of the invention through the VME bus 538. In one embodiment the central processor 562 comprises a Motorola 68030 CPU. The motion controller 504 is comprised of a tray handler 518, a microscope stage controller 520, a microscope tray controller 522, and a calibration slide 524. The motor drivers 526 position the slide under the optics. A bar code reader 528 reads a barcode located on the slide 524. A touch sensor 530 determines whether a slide is under the microscope objectives, and a door interlock 532 prevents operation in case the doors are open. Motion controller 534 controls the motor drivers 526 in response to the central processor 540. An Ethernet communication system 560 communicates to a workstation 542 to provide control of the system. A hard disk 544 is controlled by workstation 550. In one embodiment, workstation 550 may comprise a Sun Spark Classic (TM) workstation. A tape drive 546 is connected to the workstation 550 as well as a modem 548, a monitor 552, a keyboard 554, and a mouse pointing device 556. A printer 558 is connected to the ethernet communication system 560.

During the time when the field of view processors 568 are obtaining image data the image capture and focus system 516 is adjusting the pixel values by an amount proportionate to the output of the strobe intensity sensor 91. The invention provides a dynamic adjustment of the output of the CCD arrays to compensate for variations in slide illumination. In an alternate embodiment of the invention a running average of strobe intensities is computed and the average value is used to compensate for variations in slide illumination. A running average of 300 samples of the illumination intensity may be used, the 300 samples may be stored in the memory of the FOV processors.

The central computer 540, running a real time operating system, controls the microscope and the processor to acquire and digitize images from the microscope. The flatness of the slide may be checked, for example, by contacting the four corners of the slide using a computer controlled touch sensor. The computer 540 also controls the microscope stage to position the specimen under the microscope objective, and from one to 15 field of view (FOV) processors 568 which receive images under control of the computer 540.

During slide processing, the computer 540 detects horizontal modulation patterns exhibited in 20× FOVs. The modulation patterns result from dirty or scratched coverslips and appear most often on plastic coverslips. Oily fingerprints on the surface of a coverslip can also generate the patterns. The patterns have appeared predominantly in the horizontal axis correlating with the direction of the scratches observed on the coverslip. If a slide with horizontal scratches is rotated 90 degrees in the object plane, the patterns move with the rotation and appear in the vertical direction.

Figure 8:
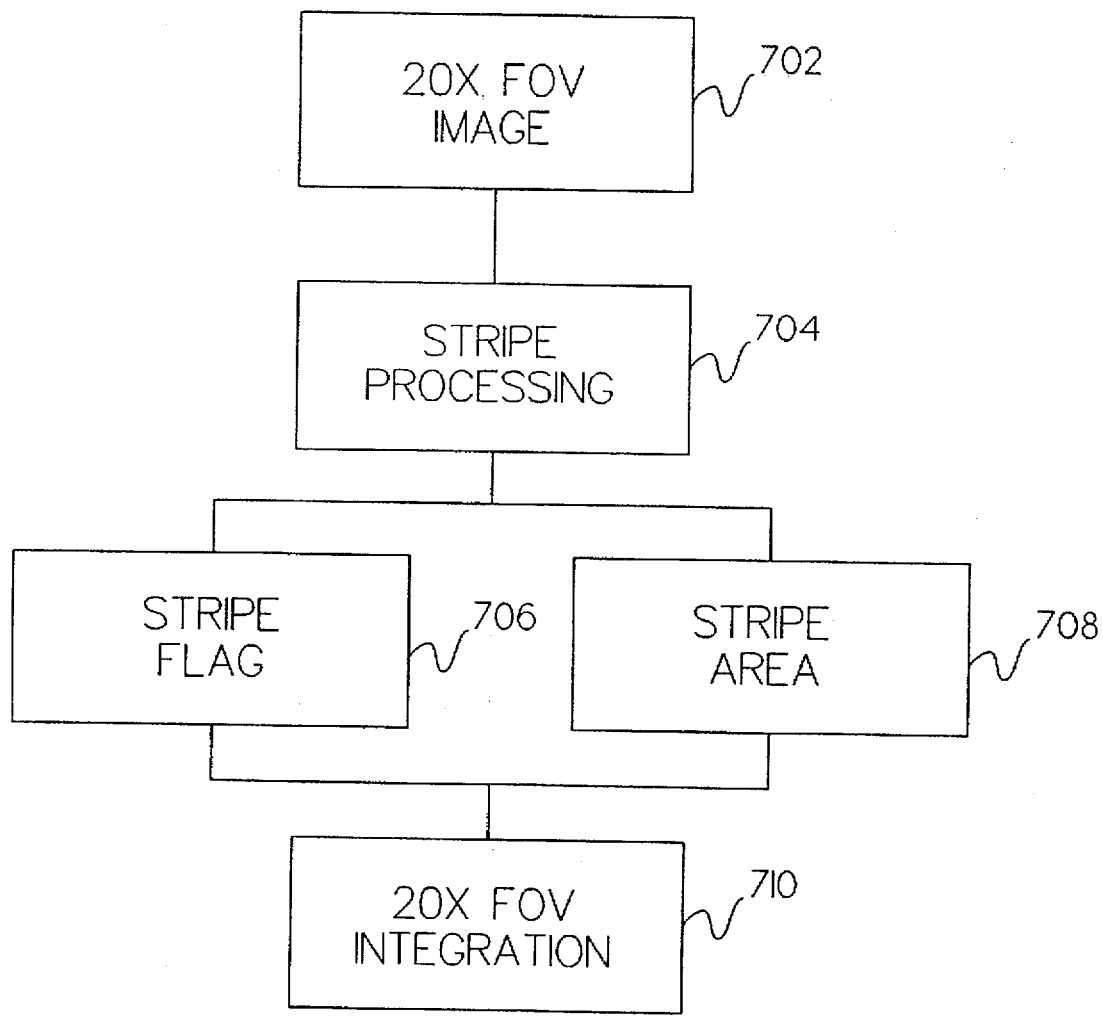
FIG. 8 shows the stripe processing of the invention to process a 20× field of view image.

Refer now to FIG. 8 which shows one embodiment of the invention to process stripes. The spatial frequency of the patterns in most cases is higher than the spatial frequency of the scratches appearing on the coverslip. This also generates the light and dark bands of periodicity in the aperture space of the condenser. The most dramatic patterns studied to date exhibit a modulation of ±5 counts on a 200 count average background. Most patterns observed are closer to a ±2.5 count modulation.

Since these patterns alter the true information content of the image, it is likely that the performance of the a slide classification system would be affected. The method and apparatus of the invention is designed to detect the horizontal modulation patterns. If the degree of the modulations is beyond a predetermined level, the slide should be considered unsuitable for processing.

The computer system 540 obtains a 20× image before trying to recognize the existence of stripes. The invention generates a stripe flag 706 and a stripe area count 708. The stripe flag 706 is "true" when a significant amount of horizontal stripe, greater than or equal to 1,000 pixels, are detected in the FOV; otherwise, the stripe flag is set to "false."

The stripe area 708 specifies the area of the detected stripe in the FOV. When the stripe flag 706 is "true," the stripe area is the number of detected stripe pixels; when the stripe flag 706 is "false," stripe area is set to zero. The stripe flag 706 and the stripe area available to determine the next level of processing for data from the 20× FOV.

The invention compensates for "stripes" that appear in the image if dust or dirt fall on the slide. A stripe pattern will appear on the 20× image 702 and will result in a modulation of the image in a stripe pattern. A stripe flag 706 and a stripe area count 708 are shown in FIG. 8. The stripe flag 706 is "true" when a significant amount of horizontal strip, in one embodiment pixels greater than or equal to 1,000, is detected in the FOV 702, otherwise, the stripe flag 706 is set to "false".

The stripe area 708 specifies the area of the detected strip in the FOV 702. When the stripe flag 706 is "true", the stripe area 708 is the number of detected stripe pixels; when the stripe flag 706 is "false", the stripe area 708 is set to zero. The stripe flag 706 and the stripe area 768 are used during FOV integration 702.

Figure 9:
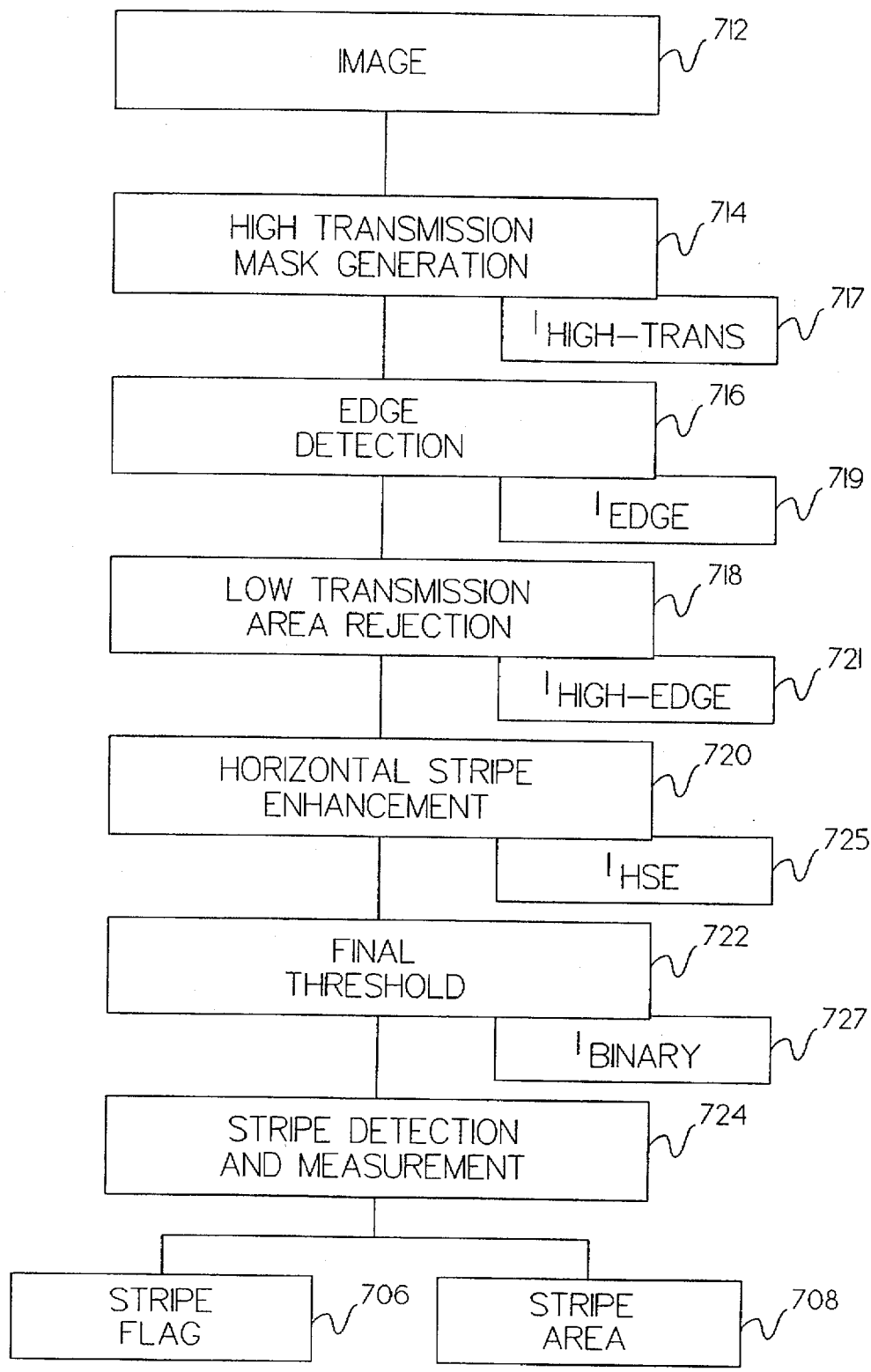
FIG. 9 shows a process flow diagram for processing a high speed image into a stripe flag and a stripe area.
Figure 10A:
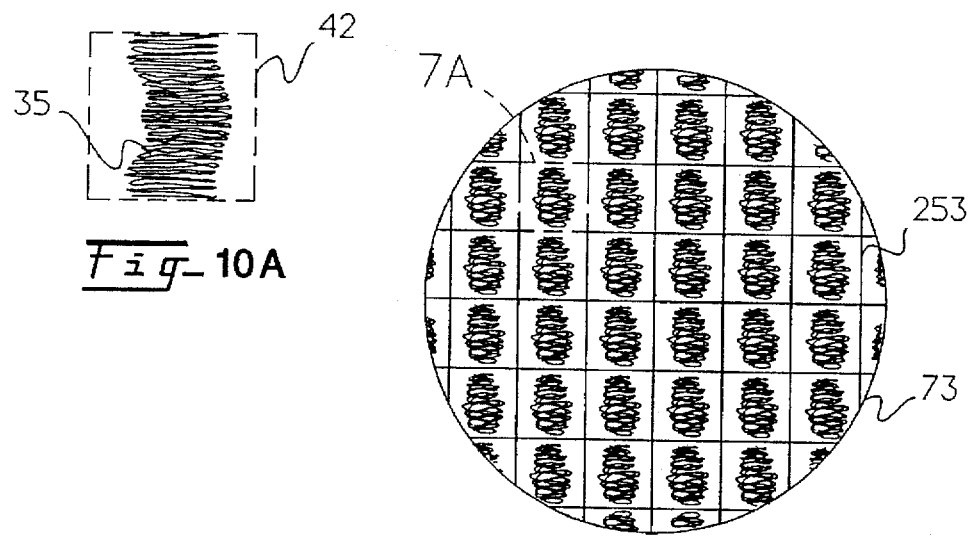
FIG. 10 shows arclets illuminating a specimen.
Figure 10:
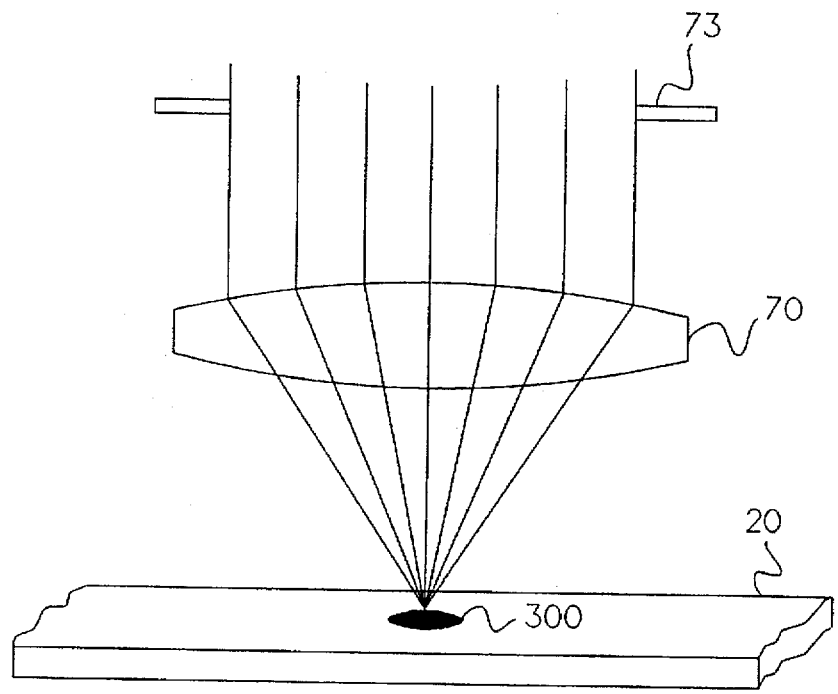
Figure 11:
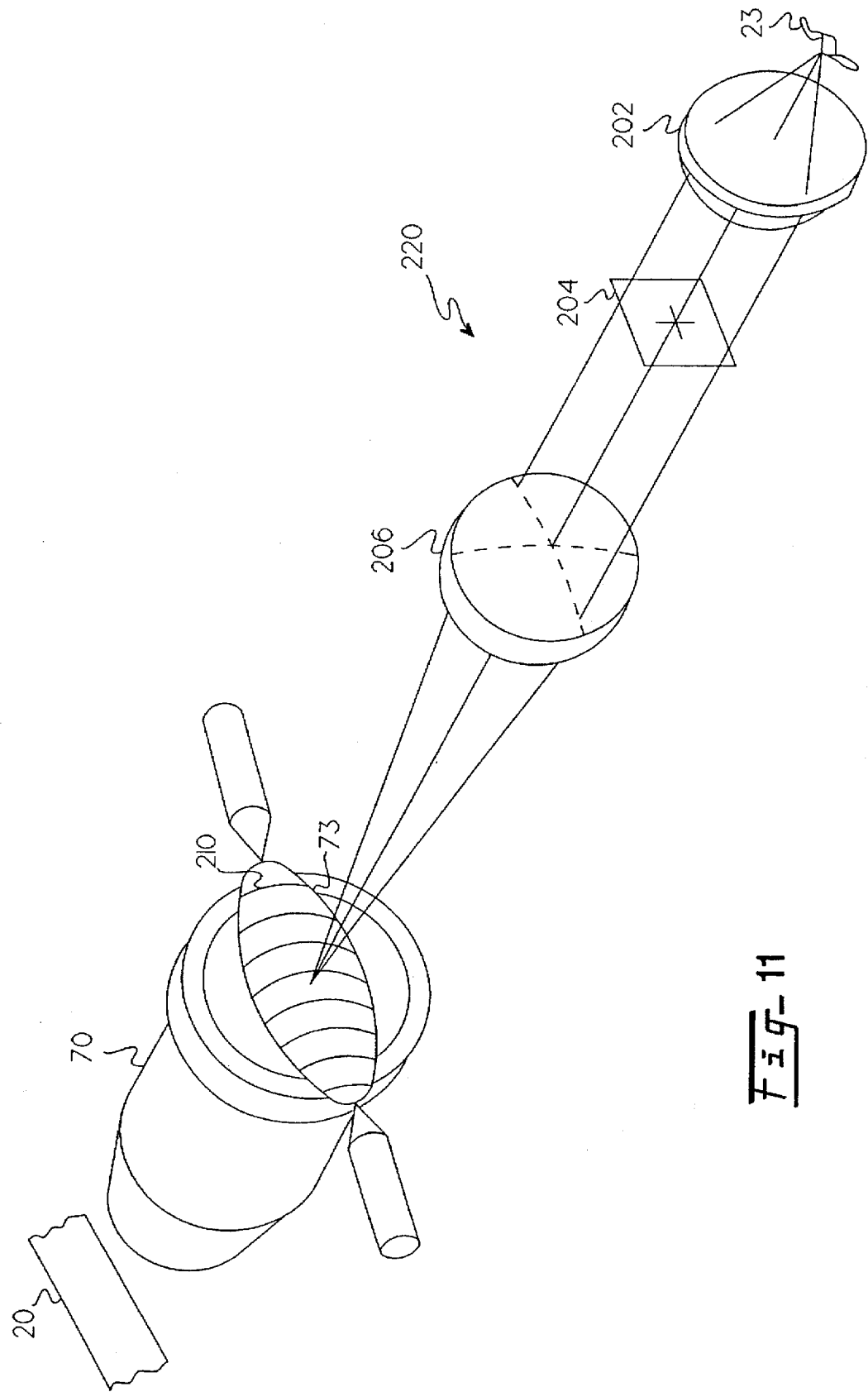
FIG. 11 shows Kohler illumination.
Figures 12A, 12B:
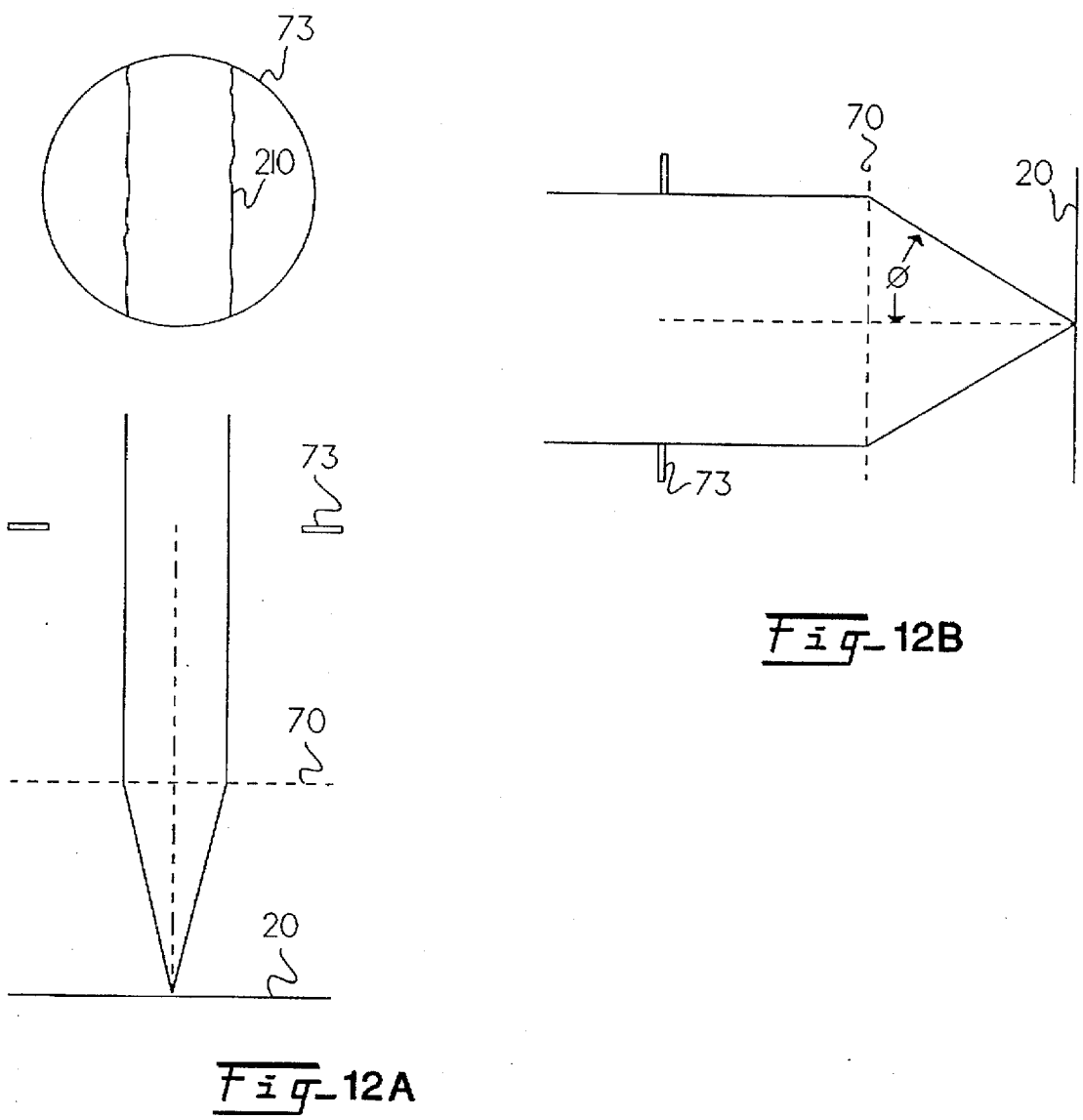
FIGS. 12A and 12B show the effects of underfill.

Refer now to FIG. 9 which shows the stripe detection method of the invention comprising six processing steps. The stripe is best revealed in the image 712 background with high light-transmission. This processing step 714 isolates the area of the image 712 having high light-transmission, in one embodiment higher than 210 in pixel value. It applies a global threshold of 210 to the original image and creates a binary image mask of the area having pixel values greater than 210. The high transmission image mask is then shrunk by two morphological erosion operations. The structuring elements include a square, 5 by 5 pixels in size, and a diamond shaped kernel, a center pixel and its four adjacent pixels in horizontal and vertical directions. The resulting high transmission mask is designated as $I_{high\_trans}$ 717.

Edge detection 716 is applied to the original image 712 to detect the edge gradient of the image. It enhances the high frequency information content of the horizontal modulation patterns. First, a grayscale morphological dilation is performed on the original image; the structuring element used is a vertical line that is 19 pixels long. Then, the original image 712 is subtracted from the dilated image. The difference image is the edge detection result $I_{edge}$ 719.

The low transmission area rejection step 718 focuses on only the edge information contained in the high transmission area of the image 712, the edge image, $I_{edge}$ 719, is combined with the high transmission image mask $I_{high\_trans}$ 717 using an AND operation. The AND operation preserves the $I_{edge}$ value of the pixels included in the $I_{high\_trans}$ mask and assigns zero to the pixels that are not in the $I_{high\_trans}$ mask. This results in a high transmission edge image, $I_{high\_edge}$ 721. In the horizontal stripe enhancement step 720, the high transmission edge image, $I_{high\_edge}$ 721, comprises both horizontal and vertical edges. To remove the vertical edges and maintain only the long horizontal edges, a grayscale morphological opening operation is applied to remove the vertical and short horizontal edges. The structuring element used is a horizontal line of 41 pixels and the horizontal stripe enhanced image is called $I_{hse}$ 725.

In the final threshold step 722, the horizontal stripe enhanced image 725 is thresholded by a value of 2. The pixels having the horizontal stripe enhanced image value greater than 2 are assigned a value "255" and the remaining pixels are assigned "0". The resulting binary image, $I_{binary}$ 727 corresponds to the detected stripe areas.

In the stripe detection and measurement step 724, the number of the pixels included in the detected stripe image mask is determined by a histogram operation. If the total number of the stripe pixels is greater than or equal to 1,000, the stripe flag 706 is set to "true." Otherwise, the stripe flag 706 is set to "false." The number of stripe pixels measured by the histogram operation is stored in the output variable, stripe area 708, when the stripe flag 706 is "true." It is set to zero when the stripe flag 706 is "false".

Those skilled in the art will recognize that other period optical disturbances may be detected by the method of the invention, such as dirt and dust on other optical elements in the optical path. In general the invention is able to detect the existence of any similar periodic pattern what ever its original cause.

Now refer to FIG. 1 which shows a schematic representation of the one embodiment of the invention's illumination. The illumination device of the invention comprises a light 10, an optical conditioning system 12, a light pipe 40, a mechanical slide with elements 54 and 56 positioned in place to intercept the light leaving the light pipe 40, and condenser optics 18. This configuration of the device provides for illumination suitable for 4× magnification of biological specimens on a microscope slide 20.

The optical conditioning system 12 includes, a collimator lens 24, an aperture stop 26, a bandpass filter 28, a condenser lens 30, a turning mirror 32 and a neutral density filter 34. The optical elements of the optical conditioning system 12, except for the neutral density wedge 34 are positioned along optical axis 36.

Light 10 comprises a light source 22 and flash power unit 17. The light source 22 is positioned to provide illumination to the collimator lens 24. In one preferred embodiment, high intensity arc lamp 23 serves as the light source 22. Typically the arc in an arc lamp 23 is not stable and tends to move from flash to flash causing illumination variation.

The optical conditioning system 12 includes a collimator lens 24 of focal length 29.5 mm, an aperture stop 26, a bandpass filter 28, another lens 30 with focal length of 100 mm, a turning mirror 32 and a neutral density filter 34. The arc lamp 23 is positioned to provide illumination to the collimator lens 24. The collimator serves to gather light from the lamp 23 and concentrate it into beam 25. This beam is directed towards and overfills an aperture stop 26. The collimator lens 24 is positioned along axis 36 between the light source 22 and the aperture stop 26. The collimator lens 24 directs the light beam 25 through the aperture stop 26. The aperture stop 26 is chosen so that the light beam 25 will overfill the aperture stop 26.

The beam then passes through a spectral bandpass filter 28 with a passband of 10 nm centered on 570 nm. These filter characteristics are chosen to provide the maximum contrast between the nucleus and cytoplasm for specimens stained with the Papanicolaou stain. Other filters may be used depending on specimen characteristics. In one embodiment of the invention the spectral bandpass filter comprises a neutral density filter (NDF). Since the transmission varies across the NDF 34, placing the NDF 34 after the homogenizer 40 would provide either arclets 21 across the aperture that vary in intensity or an illumination field that varies in intensity at the slide 20. Likewise, placing the NDF 34 before the input aperture will result in an illumination whose intensity is dependent on angle. The homogenizer conserves the angular distribution of the light so it will not have a corrective effect on the angular distribution of the light. Placing the NDF 34 after the homogenizer may either create spatial or angular intensity variations or combinations of both.

The neutral density filter 34 may be positioned orthogonal to the light beam 25. The neutral density filter 34 has a control input and regulates the transmission of light beam 25 passed through the neutral density filter 34 according to a control signal 43, providing an attenuated light beam 35. The control signal 43 may be provided during calibration of the light 10. The neutral density filter 34 in one embodiment is comprised of a disk having a clear area in a pie shaped section. The remainder of the disk varies linearly in density in a radial direction from 0.0 optical density to 3.0 optical density. Optical density is related to transmission in the following way where T is transmission and OD is optical density.

$$OD = \log(1/T)$$

The filter is attached to a drive motor 33 for the purpose of changing its rotation to pass either more or less light depending on the needs of the system. The neutral density filter 34, NDF 34, is located in the proximity (2 mm) of the input aperture 42 because the transmission across the NDF 34 varies radially around the NDF 34. The light pipe 40 homogenizes this variation.

The light beam 25 provided by an arc lamp may vary due to aging, variation in the amount of energy, and other causes. When light beam 25 provides an excess of light intensity, the neutral density filter 34 may be rotated such that a less transmissive optical region may be used. When the light beam 25 provides a lesser amount of light intensity, a more optically transmissive region may be used. In one preferred embodiment of the invention, the neutral density filter 34 provides variable transmittance that changes at a continuous rate.

The beam then passes through the lens element 30 which creates an image of the arc lamp 35 at a 3× magnification at a distance of 100 mm from the lens element 30. This image is conjugate with the input aperture 42 of the light pipe However, before reaching the light pipe 40, the beam passes through a neutral density filter and is deviated 90 degrees by a turning mirror 32. Those skilled in the art will appreciate the mirror 32 provides for a designed footprint and that other configurations are possible without deviating from the scope of the invention. The aperture stop 26 in conjunction with the lens elements 24 and 30 limit the input numeric aperture into the light pipe 40 to NA 0.13. Lenses 24 and 30 in combination provide a 3:1 magnification of the arc 23 at the input of the light pipe 40. The magnified image 35 of the arc is roughly 1.8 mm at the input aperture to the light pipe 40. The input aperture 42 is square with a 2.6 mm side dimension. These dimensions were chosen to underfill the input aperture to the light pipe 40 to allow for lateral movement of the arc without causing obscuration leading to light loss. Those skilled in the art will appreciate other ratios of underfill can be used without deviating from the scope of the invention.

Light pipe 40 has an input aperture 42 and an output aperture 44. Light entering the light pipe 40 at the input aperture. 42 travels in a direction along the optic axis reflecting off the walls until it exits at point 41. A pellicle 16 encapsulates the end of the light pipe 40 in a sealed and clean space. This prevents dust from landing on the output aperture 41 and being imaged onto the specimen 20. The pellicle 16 is positioned far enough beyond the aperture 41 to keep dust that may fall on it, out of focus at the specimen 20. The lens 56, with a focal length is positioned to collimate the output beam of the light pipe 40 originating at the output aperture 41. Additionally, the lens 56 images the input aperture 42 of the light pipe 40 at a point roughly 21.6 mm beyond the principle plane of the lens 56. This point is roughly 1 mm beyond the turning mirror 54. The lens 58 with a focal length of 100 mm accepts the collimated light beam from lens 56 and creates an image 252 of the output aperture 41. The path is deviated twice by 90 degrees with two turning mirrors 54. Lens 58 also serves to collimate the input aperture image 250. The beam is again deviated 90 degrees by a turning mirror 54 to be accepted by the lens 59. Lens 59 with a focal length of 100 mm is positioned along the axis to collimate the image 252 of the output aperture 41. At the same time, lens 59 forms an image 253 of the input aperture 42 at a point 100 mm beyond the principal plane of the lens 59. The image 253 is comprised of a plurality of arclet images formed by the interaction of the light pipe 40 and the previously disclosed elements.

The slide 20 itself changes the location of the field stop image due to its optical characteristics. Over sizing the stop 44 provides a full zone of illumination. A beam splitter 62 with a 70:30 reflection to transmission ratio intercepts the beam allowing 30% of the incident light to pass through. Seventy percent of the light is deviated 90 degrees to allow the image 253 to be formed in the vicinity of the pupil 73 of the condenser lens 70. The condenser lens 70, with a focal length of 20 mm, forms a secondary image 256 of the exit aperture 41 conjugate with the specimen plane 20. Light forming this image first passes through the microscope slide 258. The image 256 is 2.6 mm on a side with a numeric aperture of 0.13. In the preferred embodiment, the output aperture 41 of the light pipe 40 serves as the field stop for the illumination system. This stop is oversized by 2 times with respect to the CCD image on the slide. This prevents vignetting which causes illumination drop-off at the edges of the field due to the absence of a full cone angle of illumination at the edge of the output aperture 41.

Slide 20 is illuminated by a number of arclets of light 21. Each arclet 21 is schematically illustrated in more detail in FIGS. 6A and 6B. The condenser lens 70 provides uniform illumination of the slide 20 by focusing the arclets 21 at infinity or near infinity. The slide is illuminated with a field of 0.52 millimeters and at a numeric aperture of 0.45 for a 20× configuration where the slide is imaged at 20× magnification. A condenser lens 70 of 2 mm focal length is positioned with its principal plane 20 mm behind the focal positions. Twenty millimeters behind the principal plane 71, aperture stop 73 is positioned to limit the angular extent of light to the slide (i.e. numeric aperture). The 70/30 RT beam splitter 62 provides strobe sensor 65 with 30% of the arclet image through a spherical lens 64. Strobe sensor 65 is conjugate in the same place as the specimen field. A spherical lens 64 is sized to receive the full lateral and angular extent of the arclet illumination. The beam splitter 62 may advantageously be positioned 65 mm behind the aperture stop 73.

Thirty-five mm from beam splitter 62 is the principal plane of lens 59. Lens 59 images the arclets 21 at the aperture stop 73 and culminates the image from the output aperture 44. The output aperture 44 of light homogenizer 40 also acts as a field stop and is encapsulated by pellicle 47 to prevent dust and debris from being imaged onto the slide 20. Because dust and debris is prevented from falling on output aperture 44, lenses 59 and 70 combine to provide a 5-to-1 magnification of the output aperture 44 of the light pipe 40. In one preferred embodiment, the field stop may be 2.6 mm on a slide to match the CCD camera size. The output aperture 44 is oversized as compared to the CCD image on the slide. This prevents vignetting which causes illumination drop off at the edges due to absence of a full cone angle at the edge of the output aperture 44.

Refer now to FIG. 2 which shows one alternate embodiment of the invention suitable for 20× microscopic illumination. In this embodiment the mechanical slide 52 is positioned to allow light to freely pass to the lens element 59. The position of lens element 59 was chosen to collimate the output of the light pipe 40 for the light beam emanating from the output aperture 41 when the mechanical slide is positioned to remove the elements 56 and 54 from the optical path. The lens element 59 also images the input aperture 42 of the light pipe 40 in the vicinity of the pupil 73 of the condenser lens 70. The condenser lens 70 with a focal length of 20 mm creates an image 256 of the output aperture 41 on the specimen 20. This image is provides for a field of illumination that is 0.52 mm on a side with an NA 0.60. However, the pupil of the condenser lens in the 20× case is set to 0.45 NA. This coupled with a Numeric Aperture of the imaging objective of 0.75 serves to maximize the contrast of the frequencies of interest in the specimen.

Now refer to FIG. 3 which shows an alternate schematic diagram of one embodiment of the apparatus of the invention to provide uniform illumination of the specimen 20. A light source 22 illuminates an optical conditioning system 12 with light. The optical conditioning system 12 provides a light bundle of a predetermined numeric aperture, predetermined spectral frequency bandpass, and predetermined intensity to the light pipe 40. The optical conditioning system 12 underfills the input of the light pipe 40. The light pipe 40 provides a light bundle of homogenized spatial content to a transport optical system 50. The transport optical system 50 collimates the output aperture 41 of the light pipe 40 while imaging the input aperture 42 of the light pipe 40 near the pupil 73 of condenser lens system 100. Imaging of the input end provides a plurality of images of the input end 42 of the light pipe 40 due to internal reflections in the light pipe 40 with a primary image of the input 42 centered on the optical axis. The plurality of images fill the input of pupil 73 of the condenser lens system 100. The condenser lens system 100 images the collimated light corresponding to the output aperture 41 onto the specimen 20. An optical sensor 122 receives and image of the specimen 20 that has been uniformly illuminated.

Now refer to FIGS. 4A, 4B, 4C, 4D and 5 which show the operation of the light pipe 40 to generate arclets 21 and homogenize an input light pattern. The light pipe 40 is a solid glass parallel-piped, preferable made of BK7. All six surfaces of the parallel piped are polished to optical smoothness. The aspect ratio of the light pipe 40 of the in one embodiment is 100:1 with a side dimension of 2.6 mm. Other aspect ratios may be chosen without deviating from the scope of the invention. Given an extreme ray angle defined by the numeric aperture of 0.13, those skilled in the art will appreciate that over eight reflections of the extreme ray occur inside the light pipe 40. The reflections follow the laws of total internal reflection and therefore are practically lossless.

FIG. 4D demonstrates the homogenization effect for a single point of light with only three passes of the extreme ray. FIGS. 4A, 4B and 4C show the effect of the light pipe 40 coupled with a lens 260 to generate arclet images A', B' and C' from a point A in the primary input aperture 42. Note, the ray fan from point A passes through the light pipe 40 without reflection and forms in image A' by lens 260. The image B' is formed by the ray fan from point A that has a ray fan defined by the following extreme rays. One extreme ray of the fan originates at point A and reflects off the side of the light pipe 40 just before it leaves the light pipe 40 at the edge of the output aperture 41. The other extreme ray defining the fan originates at point A and reflects off the light pipe 40 at a point halfway between the input and output apertures 42 and 41 respectively. If one were to trace these rays backwards in space, shown as dotted lines 300 and 301, they would intersect at a point in space originating in the same plane as the input aperture 42. They would also intersect at a point exactly one aperture width away from point A. Likewise the image C' and its complement virtual object C are formed in the same manner. Note that the images A',B' and C' are practically all at the same intensity level due to the lossless total internal reflections of the light pipe 40. Those skilled in the art will also appreciate that an additional set of images A", B" and C" etc. will also form on the opposite side of the axis from the primed images due to complementary ray fans on the other side of the optic axis originating at point A.

In the preferred embodiment of this invention those skilled in the art will appreciate that given the length of the light pipe 40 in combination with the input NA, approximately sixteen images, eight on each side of the optical axis, of the input aperture 42 will be formed at the condenser pupil 73. Those skilled in the art will also appreciate that the prime images A', B' and C' will move in a direction opposite in sign from the double prime images A", B" and C" as the primary arc image A moves laterally on the input aperture 42. This provides for a mitigation of the effects of shading due to arc movement at the input aperture 42.

Figure 5:
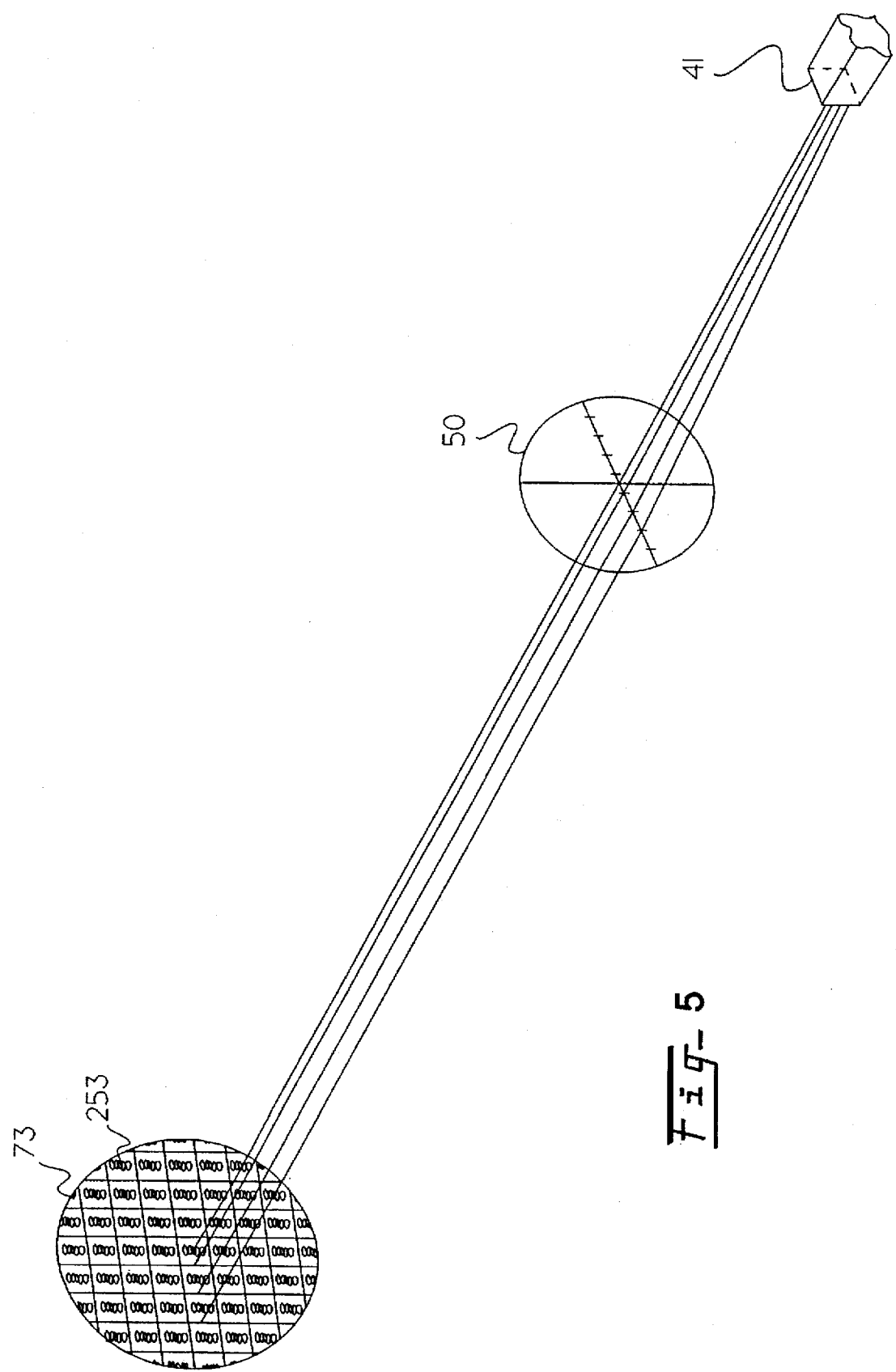
FIG. 5 shows a schematic of the light pipe generating a plurality of arclets of light.

FIG. 5 shows a perspective drawing of the plurality of arclet images filling the input pupil of the condenser by means of the light pipe 40 and the lens system 260. Those skilled in the art will appreciate that other combinations of the NA and length can be constructed and will not deviate from the scope of the invention.

FIGS. 6A and 6B show the effect of underfill on light intensity stability. FIG. 6A shows the arc centered in the aperture stop 26. In FIG. 6B the arc has moved to the edge of the aperture. Because magnification of the arc is chosen to underfill the aperture stop 26, this movement of the arc does not significantly affect the intensity of the light passed through the aperture stop 26. When the arc is magnified to fill the aperture stop 26, this movement of the arc would cause over half of the arc to be occluded, reducing the intensity of light passed through the aperture stop 26 by a like proportion.

In the place of arclets, a mask may be placed in the aperture space of the condenser lens. This mask may contain periodic structures of semi-opaque and semi-transparent areas. FIG. 13 shows such a mask. This mask will generate angular intensity variation in the cone angle of illumination of the specimen. This angular variation causes the flaws and contaminants on the coverslip to cast shadows of the predetermined spatial frequencies in the image plane of the specimen. Those skilled in the art will appreciate that a multitude of masks can be used for this purpose and this will not deviate from the scope of the invention.

Those skilled in the art will appreciate the fact that many other light sources may be used such as florescent lamps, LASERS, Laser Diodes, Light emitting diodes, and continuous arc lamps and photo-luminescent sources without deviating from the scope of the invention.

Those skilled in the art will also appreciate that other detection techniques, such as Fourier decomposition of the image, followed by identification and measurement of a spectral peak corresponding to the frequency of the modulation patterns in the image plane without deviating from the scope of the invention.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for automatic determination of a condition of a microscope slide coverslip, wherein the microscope slide coverslip covers a specimen, the method comprising the steps of:

(a) generating periodically structured light;

(b) illuminating the microscope slide with the periodically structured light;

(c) obtaining a digital representation of the specimen;

(d) recognizing at least one periodic modulation pattern in the digital representation; by detecting at least one stripe region in the digital representation and measuring an area of the at least one strip region; and (e) processing the at least one periodic modulation pattern to determine the condition of the microscope slide coverslip.

2. The method of claim 1 wherein the step of detecting at least one stripe region in the digital representation further comprises the steps of:

(a) generating a high transmission mask of the digital representation;

(b) recognizing at least one edge in the high transmission mask to generate an edge image;

(c) generating a high edge mask from the edge image;

(d) recognizing and enhancing at least one stripe in the high edge mask to generate a stripe image; and (e) performing a final thresholding on the stripe image to generate a binary image representing the at least one stripe region.

3. The method of claim 2 whereto the step of generating a high transmission mask further comprises the steps of:

(a) applying a global threshold of a predetermined value to the digital representation;

(b) creating a binary image mask of an area having pixel values greater than the predetermined value; and (c) eroding the binary image mask to generate the high transmission mask by a predetermined kernel.

4. The method of claim 2 wherein the step of recognizing at least one edge in the high transmission mask to generate an edge image further comprises the steps of:

(a) performing a grayscale morphological dilation on the high transmission mask to obtain a dilated image; and (b) subtracting the dilated image from the high transmission mask to generate the edge image.

5. The method of claim 2 wherein the step of generating a high edge mask from the edge image further comprises logical ANDing the edge image with the high transmission mask.

6. The method of claim 2 wherein the step of enhancing stripes further comprises processing both horizontal and vertical edges.

7. The method of claim 6 further comprising the steps of removing edges from the digital representation that are perpendicular to the at least one periodic modulation pattern using a grayscale morphological opening operation.

8. The method of claim 2 wherein the step of performing a final thresholding on the stripe image further comprises the steps of thresholding the stripe image by a predetermined value wherein pixels having a value greater than the predetermined value are assigned a value 1 and remaining pixels are assigned a different value wherein a resulting binary image corresponds to stripe areas.

9. The method of claim 2 further comprising the step of determining a number of pixels in the binary image belonging to stripes.

10. The method of claim 9 wherein the step of determining a number of pixels in the binary image belonging to stripes further comprises performing a histogram operation.

11. The method of claim 9 further comprising the steps of determining whether the number of pixels is greater than or equal to a predetermined limit, then setting a stripe flag to "true", otherwise, setting the stripe flag to "false."

12. The method of claim 10 further comprising the step of storing the number of pixels as an output variable, "stripe area" when the stripe flag is "true", and setting "stripe area" to zero when the stripe flag is "false."

13. A method for automatic determination of a condition of a microscope slide coverslip, wherein the microscope slide coverslip covers a specimen, the method comprising the steps of:
 (a) generating periodically structured light;
 (b) illuminating the microscope slide with the periodically structured light;
 (c) obtaining a digital representation of the specimen;
 (d) recognizing at least one periodic modulation pattern in the digital representation; and
 (e) processing the at least one periodic modulation pattern to determine the condition of the microscope slide coverslip further including the step of determining an area in pixels of the at least one periodic pattern.

14. The method of claim 13 further comprising the step of determining whether the area exceeds a limit.

15. An apparatus for determining a condition of a microscope slide coverslip, wherein the microscope slide covers a specimen, the apparatus comprising:
 (a) means for illuminating the microscope slide with periodically structured light comprising angular intensity variations;
 (b) means for obtaining a digital representation of specimen having a digital representation output;
 (c) means for recognizing at least one periodic modulation pattern in the digital representation output further comprising a means for detecting at least one stripe region in the digital representation, and a means for measuring an area of the at least one stripe region; and
 (d) means for determining a condition of the microscope slide coverslip connected to the digital representation output, wherein the means for determining further comprises a means for processing the at least one periodic modulation pattern to determine a condition of the microscope slide coverslip, and wherein the means for determining has a microscope slide coverslip condition output.

16. The apparatus of claim 15 wherein the means for detecting at least one stripe region in the digital representation comprises the steps of:
 (a) means for generating a high mission mask of the digital representation;
 (b) means for detecting edge images in the high transmission mask to generate an edge image;
 (c) means for generating a high edge mask from the edge image;
 (d) means for enhancing stripes in the high edge mask to generate a stripe image; and
 (e) means for performing a final thresholding on the stripe image to generate binary image representative of the at least one stripe region.

17. The apparatus of claim 16 wherein the means for generating a high transmission mask of the digital representation comprises:
 (a) means for applying a global threshold of a predetermined value to the digital representation;
 (b) means for creating a binary image mask of pixel values greater than the predetermined value; and
 (c) means for shrinking the high transmission mask by a pre-determined size.

18. The apparatus of claim 16 wherein the means for detecting edge images in the high transmission mask to generate an edge image further comprises the steps of:
 (a) means for performing a grayscale morphological dilation on the high transmission mask to generate a dilated image; and
 (b) means for subtracting the dilated image from the high transmission mask to generate the edge image.

19. The apparatus of claim 16 wherein the means for generating a high edge mask further comprises a means for logical ANDing the edge image with the high transmission mask.

20. The apparatus of claim 16 wherein the means for enhancing stripes further comprises a means for processing both horizontal and vertical edges.

21. The apparatus of claim 20 further comprising a means for removing edges substantially perpendicular to substantially periodic modulation patterns in the digital representation and a means for maintaining only long substantially parallel edges using a grayscale morphological opening operation applied to remove substantially perpendicular and short substantially parallel edges.

22. The apparatus of claim 16 wherein the means of performing a final thresholding on the horizontal stripe image further comprises the steps of thresholding the horizontal stripe image by a predetermined value wherein pixels having values greater than the predetermined value are assigned a value 1 and remaining pixels are assigned a different value wherein a resulting binary image corresponds to detected stripe areas.

23. The apparatus of claim 16 further comprising a means for determining a number of pixels included in the digital representation.

24. The apparatus of claim 23 wherein the means for determining a number of pixels further comprises a means for performing histogram operations.

25. The apparatus of claim 23 further comprising a means for determining whether a total number of pixels is greater than or equal to a pre-determined limit, and a means for setting a stripe flag to "true", otherwise, setting the stripe flag to "false."

26. The apparatus of claim 25 further comprising a means for storing a number of pixels as an output variable, "stripe area," when the stripe flag is "true", and setting it "stripe area" to zero when the stripe flag is "false."

27. The apparatus of claim 15 further including means for determining an area of the at least one periodic modulation pattern.

28. The apparatus of claim 27 further comprising means for detecting whether the area exceeds a limit.

29. An apparatus for detecting a condition of a microscope slide coverslip, wherein the microscope slide coverslip covers a specimen, the apparatus comprising:

(a) a light source for providing light;

(b) a first lens positioned to image the light source so as to produce an image;

(c) a light pipe having an input aperture an output aperture, wherein the input aperture is located to receive light and the output aperture provides periodically structured light comprising angular intensity variations to illuminate the microscope slide coverslip;

(d) a second lens to image the output aperture on the microscope slide coverslip;

(e) means for checking for at least one periodic modulation pattern in the image of the specimen; and (f) means for relating the condition of the microscope slide coverslip to the at least one periodic modulation pattern.

30. The apparatus of claim 29 wherein the first lens is positioned to receive the light having a plurality of input aperture images, and the second lens is positioned to receive the plurality of input aperture images such that an image of the plurality of input aperture images is imaged near the aperture of the second lens.

31. The apparatus of claim 29 further comprising:

(a) a lamp having an arc for providing light; and (b) conditioning optics for gathering the light from the arc and imaging it onto the input aperture such that the arc underfills the input aperture.

32. The apparatus of claim 29 further comprising specimen condenser optics to illuminate a field on the microscope slide coverslip at a predetermined size and at a predetermined numeric aperture.

33. The apparatus of claim 29 wherein the second lens comprises a microscope condenser lens.

* * * * *

UNITED STATES PATENT AND TRADEMARK OFFICE
CERTIFICATE OF CORRECTION

PATENT NO. : 5,692,066
DATED : November 25, 1997
INVENTOR(S) : Lee et al.

It is certified that error appears in the above-identified patent and that said Letters Patent is hereby corrected as shown below:

Item [57]
<u>In the Abstract</u>

The second to the last line, delete the word "an" and replace it with -- and --.

Column 1, line 6, delete the word "liner" and replace it with -- linear --.

Column 2, line 1, delete the word "it's" and replace it with -- its --.

Column 3, line 28, delete the word "TEE" and replace it with -- THE --.

Column 3, line 58, delete the word "saute" and replace it with -- same --.

Column 3, line 67, after number "116" insert -- to --.

Column 4, line 4, after serial number "08/309,115" insert -- to Lee et al. --.

Column 4, line 43, delete number "515" and replace it with -- 516 --.

Column 5, line 53, delete the word "a".

Column 6, line 18, delete number "768" and replace it with -- 708 --.

Column 6, line 46, delete "$I_{high\text{-}trans}$" and replace it with -- $I_{high\_trans}$ --.

Column 8, line 35, after the word "pipe" insert -- 40 --.

Column 8, line 56, delete the ".".

<u>In the Claims</u>

Column 12, line 24, delete the word "strip" and replace it with -- stripe --.

Column 12, line 42, delete the word "whereto" and replace it with -- wherein --.

UNITED STATES PATENT AND TRADEMARK OFFICE
CERTIFICATE OF CORRECTION

PATENT NO. : 5,692,066
DATED : November 25, 1997
INVENTOR(S) : Lee et al.

It is certified that error appears in the above-identified patent and that said Letters Patent is hereby corrected as shown below:

<u>In the Claims - Continued</u>

Column 13, line 27, after the word "slide" insert -- coverslip --.

Column 13, line 36, after the word "periodic" insert -- modulation --.

Column 13, line 45, after the word "of" insert -- the --.

Column 13, line 64, delete the word "mission" and replace it with -- transmission --.

Column 14, line 6, after "generate" insert -- a --.

Column 15, line 7, after the word "aperture" insert -- and --.

Column 16, line 9, delete the word "are" and replace it with -- arc --.

Signed and Sealed this

Twenty-ninth Day of December, 1998

*Attest:*

BRUCE LEHMAN

*Attesting Officer*          *Commissioner of Patents and Trademarks*